Sept. 15, 1925.
H. F. STEVENS
SAFETY DEVICE FOR VEHICLES OR THE LIKE
Filed April 26, 1923     2 Sheets-Sheet 1
1,553,729
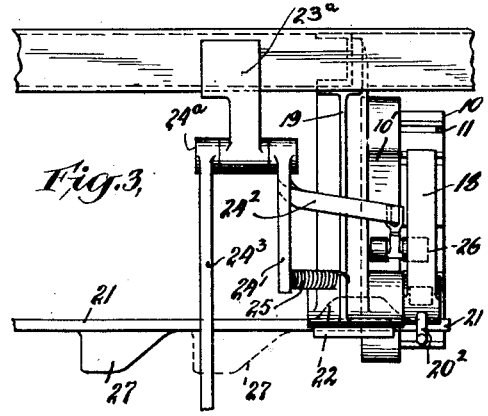
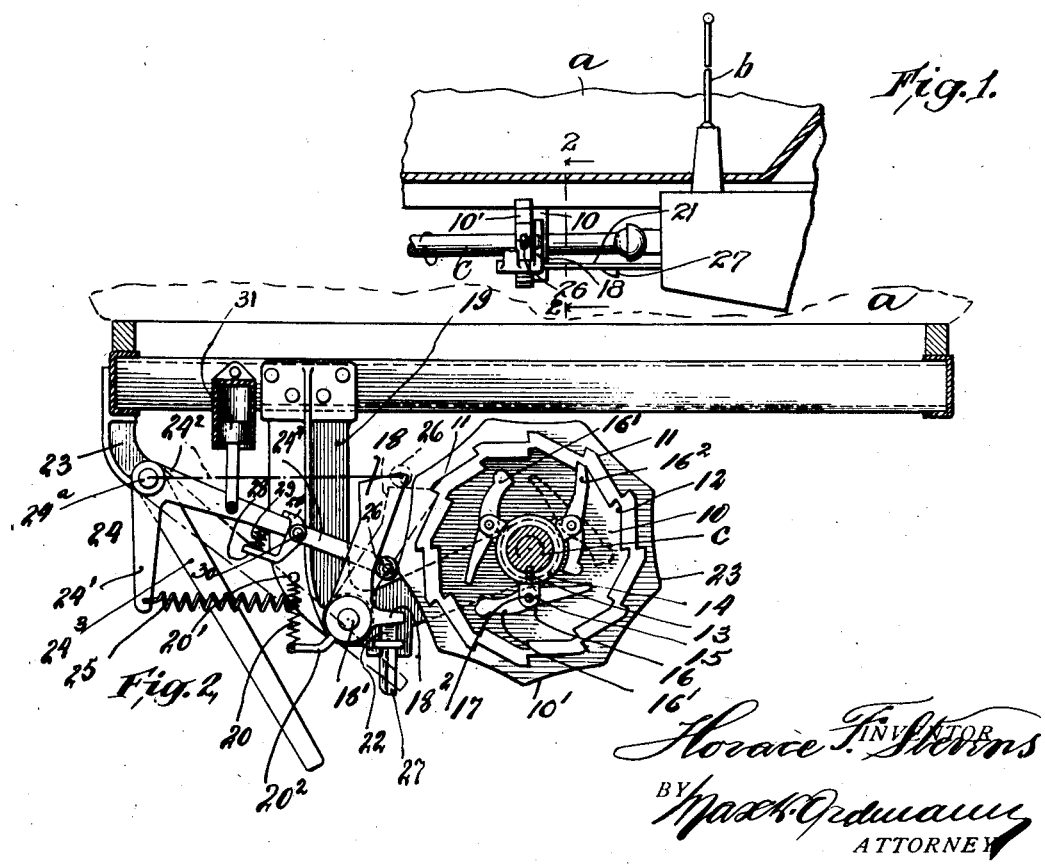

Sept. 15, 1925.
H. F. STEVENS
SAFETY DEVICE FOR VEHICLES OR THE LIKE
Filed April 26, 1923   2 Sheets-Sheet 2
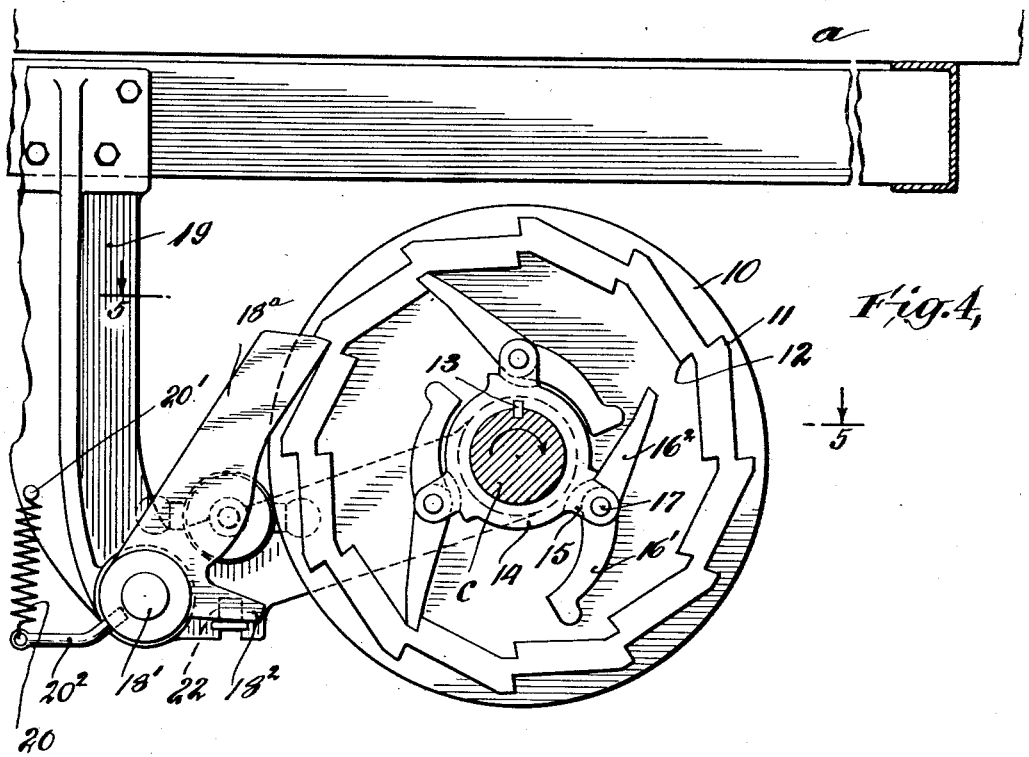
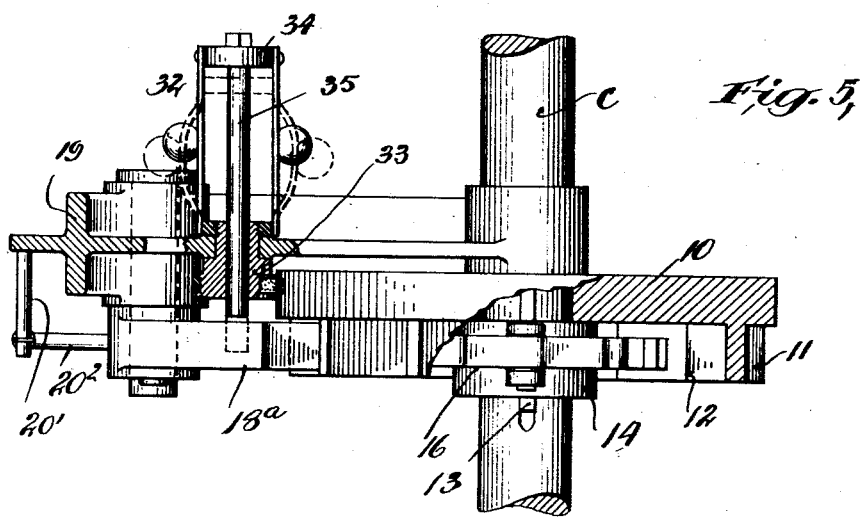

Patented Sept. 15, 1925.

1,553,729

UNITED STATES PATENT OFFICE.

HORACE F. STEVENS, OF KENILWORTH, NEW JERSEY.

SAFETY DEVICE FOR VEHICLES OR THE LIKE.

Application filed April 26, 1923. Serial No. 634,876.

*To all whom it may concern:*

Be it known that I, HORACE F. STEVENS, a citizen of the United States, residing at Kenilworth, in the county of Union and State of New Jersey, have invented certain new and useful Improvements in Safety Devices for Vehicles or the like, of which the following is a specification.

This invention relates to safety devices for vehicles, particularly motor vehicles, and has for its object to provide means for locking a revolving element against accidental rotation, while intended to be in a state of rest. When applied to vehicles, the function of such device is to prevent the vehicle from traveling or rolling backwards or forwards, while on a grade or hill, and while the brakes either fail to function or are released, except when the transmission gears are set in the position of the direction of travel. Since most accidents result from rolling back, I shall in the following describe the means for preventing backward rolling, with the understanding that by adding a device of identical or similar construction for the forward travel, my invention can be used to perform the object in any direction.

According to this invention, the safety means comprise substantially a movable body loosely mounted on a suitable driven part of the driving mechanism, means adapted to be controlled from the driver's seat and capable of locking said body in position, and a centrifugally or otherwise automatically controlled member revolving with said driven part and capable, when the latter has the tendency to roll or rotate, when not driven or adjusted to neutral position, of engaging said movable body, while the latter is locked.

My invention also consists of the provision of auxiliary safety means to prevent the locking of said movable body, while the vehicle is driven.

Other objects of the invention will appear from the detailed description thereof.

While in the following I shall describe two embodiments of my invention, I wish it to be expressly understood that I do not at all limit myself to the particular constructions shown, nor to the application of my device to vehicles, since various other modifications of the construction may be made, and since the device may be used in connection with other apparatus, without departing from the principle underlying my invention.

In the accompanying drawing, in which similar reference characters denote corresponding parts, Fig. 1 is a longitudinal section of a portion of a motor vehicle equipped with my device; Fig. 2 is a cross section on line 2—2 of Fig. 1, showing a face view of the device; Fig. 3 is a side view of the device; Fig. 4 is a section similar to Fig. 2, showing a modified construction of the safety means; and Fig. 5 is a section on line 5—5 of Fig. 4.

$a$ denotes a motor vehicle, $b$ the gear shift lever and $c$ a revolving element of the driving mechanism, such as the propeller shaft. The safety device forming the subject matter of this invention comprises a body 10, preferably in the shape of a drum, formed externally and internally with ratchet teeth 11, 12, respectively, and loosely or revolvably mounted on said element $c$. Keyed or otherwise fixed to said element $c$, as at 13, is a sleeve 14 or the like, formed on its circumference with lugs 15, at least one, which carry members 16 in form of double armed levers free to swing on horizontal pivots 17. One arm 16' of each of said levers is weighted, so that, when the sleeve 14 revolves with the element $c$, the weighted arms 16' of said members, by centrifugal force, will swing away from the sleeve 14, and thereby cause the opposite arms $16^2$ thereof to turn toward the sleeve 14. When, on the other hand, the latter slows down or is at rest, such of the arms 16', which happen to lie on or near the upper part of the sleeve, will tend, by reason of their weight, to return into initial position, or close to the sleeve 14. The arms $16^2$ of these levers are adapted to act as pawls in cooperation with the inner teeth 12 of the drum by engaging the same, when in outwardly directed position, which they will occupy, when lying on top of the sleeve 14, and the latter slows down or is at rest. Adapted to cooperate with the outer teeth 11 of the drum is a pawl 18, pivotally supported at 18' in a bracket 19 fixed to and projecting downwardly from the chassis of the vehicle. This pawl 18 is adapted to be controlled or operated from the driver's seat, simultaneously with the shifting of the gears from neutral to either forward or backward drive, according to the control desired. In the present instance, the device is assumed to serve for preventing backward rolling or travelling, while the driving gears are in neutral. In such case, the pawl 18 will have to be in engagement with the external teeth 11 of the drum 10 locking the latter in position, when the element $c$ and the sleeve 14 are revolving in clockwise direction (Fig. 2), so that should the propeller shaft or element $c$, after coming to rest on an up-grade, tend to turn in opposite direction, the arms $16^2$ will at once engage the internal teeth 12 of the drum, which, by engagement with the external pawl 18, is fixed in position.

When, however, the vehicle is driven in the opposite direction, that is to say, when, as in the present instance, the gears are adjusted to reverse, the pawl 18 must be disengaged from the drum 10, in order to prevent damage to the parts of the driving mechanism and of the device, because of the possible engagement of the arms $16^2$ with the internal teeth 12 of the drum, which might occur at low speed or through inertia on a sudden stop. To this end, in the present example, the pawl 18 is under the action of a spring 20, whose one end is fixed to the bracket 19, as at 20', and whose other end is fixed to a finger $20^2$ rigid with said pawl 18. The spring 20 has the tendency to swing the pawl 18 toward the drum 10 and cause its engagement with the external teeth 11 thereof, locking the drum in position. The disengagement of the pawl 18 from the drum 10 is effected in a positive manner by means of a bar 21, which extends longitudinally of the vehicle and which may be a part of or operatively connected to the usual gear shifting bar operated in well known manner through the gear shift lever $b$ (Fig. 1). The bar 21 provided with a cam shaped projection 22, which is adapted to cooperate with a finger $18^2$ rigid with the pawl 18, so that on the rearward displacement of the bar 21, through the manipulation of the gear shifting mechanism, it will pass underneath the finger $18^2$ to lift the latter and thereby swing the pawl 18 away from the drum 10, releasing the latter. When for passing from the reverse into neutral, the gears are again shifted, the bar 21 and its cam 22 are withdrawn releasing the finger $18^2$, the spring 20 will thrust the pawl 18 back into contact with the drum and into engagement with the external teeth 11 thereof. But, owing to momentum, the drum will have the tendency to continue its rotary motion in the same anti-clockwise direction, while, during the reduced speed of the element $c$ or when the latter is brought to a standstill, one or more of the internal pawls 16 may have come into engagement with the internal teeth 12 of the drum, it is necesary that the pawl 18 be not allowed to return into engagement with the teeth 11, before the drum has come to a full stop, in order to prevent damage to the parts of the device and of the driving mechanism. To safeguard against such accidents, I provide an auxiliary safety device which, according to the present example, shown in Figs. 1–3, comprises a plurality of cam portions 10' projecting from the circumference of the drum and means capable of intervening between the pawl 18 and said drum or said cam portions, during the rotation of the drum 10. These means may comprise a multiple armed lever 24 pivoted at $24^a$ to a bracket 23 projecting from the chassis. One arm 24' of said lever is actuated by a spring 25, whose one end is fixed to said arm 24' and the other end to the bracket 19. Another arm $24^2$ of said lever 24 carries at its free end a roller 26, and is made of a length about equal to the distance between the pivot $24^a$ and the drum 10, so that when the pawl 18 is withdrawn from contact with the drum 10, the roller will be allowed to pass into the space between said pawl 18 and drum to act as an obstruction, preventing the pawl 18 from returning into engagement with the drum 10. The spring 25 has the tendency to swing the lever 24 upwardly into normal position, where the roller 26 of the arm $24^2$ will be above or rest on the upper edge of the pawl 18. The third arm $24^3$ is adapted to normally extend across the path of the bar 21, as indicated by dotted lines in Fig. 2. The bar 21 is provided with a second cam shaped projection 27 arranged at a certain distance away from the cam surface 22 and which, when the bar 21 is shifted rearwardly during the operation of the gear shifting mechanism, will swing the arm $24^3$ and with it the other two arms 24', $24^2$, downwardly and laterally, whereby the roller 26 will be positively moved into the space between the pawl 18 and the drum 10 or its cam surfaces 10' to act as an obstruction in the aforedescribed manner. Therefore, when in passing from the reverse to neutral the bar 21 is withdrawn from engagement with the nose $18^2$ of the pawl 18, the latter by action of its spring 20 will have the tendency to swing toward the drum, but will be unable to do so, owing to the intervention of the roller 26. As long as the drum, owing to momentum, keeps on revolving in anticlockwise direction, the cam portions 10', one by one will by impact with the roller 26 depress the arm $24^2$, not permitting the latter to escape, and thereby hold the pawl 18 out of engagement with the drum 10. When the motion of the drum, owing to the braking effect suffered through the impacts with the roller 26, has slowed down to such an extent that the speed of the upward swing of the lever 24 will be greater than that necessary to bring the next crest of the cam surface into the path of the roller 26, the latter will be allowed to escape and the pawl 18, through the action of its spring 20, be thrust against the drum. With such slow motion, and because a certain fraction of time is required for the pawl to pass from its retracted position into contact with the drum and engagement with the teeth, there is no danger that the escape of the roller will be premature and damage will result through the engagement of the pawl with the drum. For the sake of precaution, however, the cam portions 10' on the drum may be multiplied to such an extent that the frequency of contact thereof with the roller, during very slow movement of the drum, may be sufficient to prevent a premature escape of the roller. It is, however, possible that the drum 10 may come to a standstill at the time a crest of its cam portions 10' occupies a position such as indicated in Fig. 2, or a little lower. In such case, the lever 24, after the withdrawal of the bar 21, will, by the action of spring 25, be thrust upwardly and the roller 26 would become jammed between said crest and the pawl 16. To render jamming impossible and permit the escape of the roller at any position of rest of the drum 10, the lever arm $24^2$ is not made of a rigid piece, but has the part $24^4$ carrying the roller 26, formed foldable on a horizontal pivot 30 and formed with a trigger like member 28 at the pivotal point. This member 28 has an upper nose 28' overlapping the upper edge of the body portion of the lever arm $24^2$ to prevent its folding beyond the upper edge of said arm, and at the lower part is actuated by a spring 29 interposed between the latter and the arm $24^2$ and which has the tendency to normally hold the section $24^4$ in linear extension of said arm $24^2$, as shown in full lines in Fig. 2. The spring 29 is so chosen, that it will be strong enough to resist the impacts of the cam portions 10', and is stronger than the spring 20 actuating the pawl 18, but is considerably weaker than the spring 25 actuating the multiple-armed lever 24. As a result, the section $24^4$, during the rotation of the drum 10, and while interventing between the pawl 18 and the drum, will not yield in downward direction, but act as a rigid part of the arm $24^2$. But when the drum 10 comes to a full stop, so that one of its crests obstructs the upward swinging movement of the lever 24, the force of the spring 25 will overcome the force of the spring 29 and cause the section $24^4$ to fold downwardly, at the same time swinging the pawl 18 against the action of its spring 20 and in this manner permit the lever 24 to return to its initial position, releasing the roller 26 from the space between the pawl 18 and the drum.

It may be useful to employ an air damper 31 of any suitable construction, with an adjustable air escape (not shown), in order to be able to regulate the action of the spring 25 in relation to the trigger spring 29.

The mode of operation will be obvious from the foregoing, but in short this may be stated to be as follows:

Assuming the vehicle to travel up-hill and the motor stalled. If the brakes are defective or released, the vehicle would roll back. As long as the gears are not adjusted to the reverse, the pawl 18 is in engagement with the drum 10, locking the latter in position. One or more of the internal pawls will be in engagement with the internal teeth 12 of the drum and thereby arrest the shaft $c$ from rotating in the reverse direction.

A similar effect will be obtained on downhill, when a device designed for preventing forward rolling is used.

When the vehicle is to be driven backward and therefore, the gear shifting mechanism adjusted to reverse, the pawl 18 through the medium of the cam 22 is swung out of contact with the drum 10, as heretofore described, so that the pawls 16, when engaging the internal teeth 12 of the drum will be permitted to turn the latter along. The operation of the intervening mechanism to prevent a permature engagement of the pawl 18 with the teeth 11 of the drum 10, before the latter comes to a full stop, has been clearly and sufficiently described.

In the modification shown in Figs. 4 and 5, the construction of the drum 10, the mechanism for engaging the internal teeth 12 thereof, the pawl $18^a$, adapted to cooperate with the teeth 11 of the drum 10, and the shifter bar 21 and cam 22 are identical with the corresponding parts in the first modification. The only difference resides in the auxiliary safety means for preventing premature engagement of the external pawl $18^a$ with the teeth 11 of the drum 10. In this modification, I employ instead of the multiple arm lever 24 and roller 26 a centrifugal governor 32 of the usual construction. This governor is rotatively mounted in the bracket 19 or other stationary part of the machine by means of a sleeve 33, adapted to be driven by frictional engagement with or otherwise from the drum 10. To the outer longitudinally movable part 34 of the governor is centrally fixed a bolt 35, which slidably extends through the sleeve 33 and is adapted, during the inward movement of the part 34, to move toward and across the path of the pawl $18^a$, as indicated by dotted lines in Fig. 5, to thereby intervene between the pawl $18^a$ and the drum 10. The bolt 35 will remain in that intervening position, as long as the drum 10 continues to revolve, which will be the case either when the gears are driven or when after the gears are set to neutral, the drum 10, by momentum, continues its rotary motion. When the drum comes to a full stop, or its rotation is very slow, the part 34 of the governor will move outwardly, retracting the bolt 35 and thereby releasing the pawl 18ᵃ.

What I claim is:

1. The combination with a revolving element, of a device of the character described, comprising an element movable independently of said first element and capable of being locked in position of rest, when the latter is revolving in a predetermined direction and means revolving with said first element and capable of coupling the latter to the second element only when the speed of said first element is reduced.

2. In a device of the character described, the combination with a revolving element, of movable means loose on said element, means capable of locking said first movable means in position, and centrifugally controlled means revolving with said element and capable, when the latter has the tendency to turn when not driven, of engaging said movable means, while the latter is locked.

3. In a device of the character described, the combination with a revolving element, of movable means loose on said element, manually controlled means capable of locking said movable means in position, and centrifugally controlled means revolving with said element and capable, when the latter has the tendency to turn when not driven, of engaging said movable means, while the latter is locked.

4. In a motor vehicle, the combination with a revolving element of the driving mechanism thereof, of a safety device comprising an element movable independently of said first element and capable of being locked in position of rest, while said first element is driven in any one direction and means adapted to lock said first named element to said second element to prevent rotation in the opposite direction only at the moment said first element is thrown out of gear.

5. In a motor vehicle, the combination with a revolving element of the driving mechanism thereof, capable of being thrown out of gear with the latter, of a device of the character described, comprising a rotary element movable independently of said first element, means controllable from the driver's seat for engaging and locking said element against movement in a direction opposite to that of said first element and means intervening between said two elements and adapted to couple the same only at the moment said first element is thrown out of gear.

6. The combination with a revolving element and a gear shifting means, of a device of the character described, comprising a rotary element loose on said first element, means controlled from said gear shifting means for unlocking said second element against rotation in a direction opposite to that of the first element, and automatic means adapted to engage said second element only at the moment said first element is thrown into neutral to prevent retrograde movement thereof.

7. The combination with a driven element of a motor vehicle and the gear shifting means, of an independently revoluble element, locking means controlled from the driver's seat for preventing said second element from rotation in a direction opposite that of the first element, means controllable from said gear shifting means for preventing locking action of said locking means until said first element is completely at rest and means actuated through said first element and adapted to engage said second element, when said first element is thrown into neutral.

8. In a vehicle, the combination with a revolving element of the driving mechanism, of a device for preventing the rolling or travelling of the vehicle, when the gears are in neutral, said device comprising a movable toothed drum loose on said element, a manually controlled pawl to cooperate with said drum to lock it in position and at least one pawl revolving with said element and capable, when said element has the tendency to turn when not driven, of being automatically thrown into engagement with said drum, while the latter is locked.

9. In a vehicle, the combination with a revolving element of the driving mechanism, of a device of the character described, comprising a rotary toothed drum, a manually controlled pawl to cooperate with said drum to lock it in position and at least one centrifugally controlled pawl, adapted to revolve with said element and capable, when the latter has the tendency to turn in the reverse direction of rotation when not driven, of being thrown into engagement with said drum, while the latter is locked.

10. In a vehicle, the combination with a revolving element of the driving mechanism, of a device of the character described, comprising a rotary toothed drum, a manually controlled pawl to cooperate with said drum to lock it in position and means adapted to revolve with said shaft and carrying at least one pawl capable, when said shaft has the tendency to turn in the reverse direction of rotation when not driven, of being thrown into engagement with said drum, while the latter is locked.

11. In a vehicle, the combination with a revolving element of the driving mechanism, of a device of the character described, comprising a rotary toothed drum, a manually controlled pawl to cooperate with said drum to lock it in position, means adapted to revolve with said element and carrying at least one pawl capable, when said element has the tendency to turn, while in neutral, of being thrown into engagement with said drum, and auxiliary safety means for preventing said manually controlled pawl from locking said drum, while the latter is in motion.

12. In a vehicle, the combination with a revolving element of the driving mechanism, of a device of the character described, comprising a rotary toothed drum, a manually controlled pawl to cooperate with said drum to lock it in position, means adapted to revolve with said element and carrying a plurality of pawls capable, while said element is in neutral and tends to turn, of being thrown into engagement with said drum, and means adapted to intervene between said first named pawl and said drum, while the latter is in motion to prevent said pawl from engaging said drum.

13. In a vehicle, the combination with a revolving element of the driving mechanism, of a device of the character described, comprising a rotary toothed drum, a manually controlled pawl to cooperate with said drum to lock it in position, means adapted to revolve with said element and carrying at least one pawl capable, when said element has the tendency to turn, while not driven, of being thrown into engagement with said drum, and a positively actuated means adapted to intervene between said first named pawl and said drum, while the latter is in motion to prevent said pawl from engaging said drum.

14. In a vehicle, the combination with a driven element of the driving mechanism, of a device of the character described, comprisng a movable body loose on said element, a manually actuated means for locking said member in position, means keyed to the driven element and carrying at least one member capable of automatically engaging said body, means capable of intervening between said manually actuated means and said body, while the latter is in motion, to prevent their engagement, said means being positively moved into intervening position, and means for releasing the intervening means.

15. The combination with a revolving element, of a device of the character described, comprising an externally and internally toothed drum, adapted to be movably mounted on said element, a sleeve adapted to be keyed to the latter, a plurality of pawls carried by said sleeve, and capable of being automatically thrown into engagement with the internal teeth of said drum, a positively actuated pawl adapted to cooperate with the external teeth of said drum to lock the latter and means capable of intervening between said external pawl and drum to prevent their engagement, when said drum is in motion.

In testimony whereof I affix my signature.

HORACE F. STEVENS.